US005164139A

United States Patent [19]

Fujioka et al.

[11] Patent Number: 5,164,139

[45] Date of Patent: Nov. 17, 1992

[54] METHOD FOR DRYING WETTED MOLDED PRODUCT

[75] Inventors: Keiji Fujioka, Amagasaki; Shigeji Sato, Ibaraki; Yoshio Sasaki, Toyonaka, all of Japan; Hiromi Naito, Ohakune, New Zealand; Teruo Miyata, Shinjuku; Masayasu Furuse, Sagamihara, both of Japan

[73] Assignees: Sumitomo Pharmaceuticals Company, Limited, Japan; Koken Co., Ltd., Tokyo, Japan

[21] Appl. No.: 690,385

[22] Filed: Apr. 24, 1991

Related U.S. Application Data

[63] Continuation of Ser. No. 200,443, May 26, 1988, abandoned.

[30] Foreign Application Priority Data

May 29, 1987 [JP] Japan ................................ 62-136733

[51] Int. Cl.[5] ............................................ B29C 71/00

[52] U.S. Cl. ............................................ 264/86; 34/9; 34/36; 210/654; 264/232; 264/344

[58] Field of Search ............... 264/233, 235, 202, 232, 264/340, 86, 87, 204, 344, 28; 424/DIG. 7; 34/5, 42, DIG. 1, 9, 22, 36; 210/654, 640

[56] References Cited

U.S. PATENT DOCUMENTS

| | | | |
|---|---|---|---|
| 3,367,787 | 2/1968 | Thijssen et al. | 210/640 |
| 3,405,058 | 10/1968 | Miller | 210/640 |
| 3,441,501 | 4/1969 | Segall et al. | 210/654 |
| 4,191,805 | 3/1980 | Nolte | 264/86 |
| 4,197,148 | 4/1980 | Shinomura | 264/49 |
| 4,383,376 | 5/1983 | Numamoto et al. | 34/9 |
| 4,645,698 | 2/1987 | Matsubara | 428/68 |
| 4,686,776 | 8/1987 | Matsubara | 34/95 |
| 4,787,900 | 11/1988 | Yannas | 264/86 |
| 4,883,597 | 11/1989 | Perlman | 210/490 |

FOREIGN PATENT DOCUMENTS

| | | | |
|---|---|---|---|
| 0016570 | 11/1928 | Australia | 264/86 |
| 2339370 | 6/1972 | Australia . | |
| 0139286 | 5/1985 | European Pat. Off. . | |
| 0230647 | 8/1987 | European Pat. Off. . | |
| 2933937A1 | 3/1981 | Fed. Rep. of Germany . | |
| 2948581A1 | 6/1981 | Fed. Rep. of Germany . | |
| 7537710 | 12/1975 | Japan . | |
| 58-51906 | 3/1983 | Japan | 210/640 |
| 60-31883 | 2/1985 | Japan | 210/640 |
| 152816 | 7/1987 | Japan . | |

*Primary Examiner*—Leo B. Tentoni
*Attorney, Agent, or Firm*—Birch, Stewart, Kolasch & Birch

[57] ABSTRACT

A method for drying a wetted molded product of pasty high viscous composition which comprises subjecting the molded product to a dehydration process while wholly or partially contacting the product with an open-cell foamed hydrophobic porous membrane.

19 Claims, 1 Drawing Sheet

METHOD FOR DRYING WETTED MOLDED PRODUCT

This application is a continuation of application Ser. No. 07/200,443 filed on May 26, 1988, now abandoned.

This invention relates to a method for drying a wetted molded product. More particularly, it relates to a method for drying a wetted molded product of a pasty high viscous composition without changing its shape. The method is particularly useful for preparing sustained release formulations which comprises a polymer as a carrier.

Various sustained release formulations are known which are implanted in lesional region of a human or animal body, thereby allowing direct action of an active ingredient to the lesion and preventing the generation of undesirable side-effects. Such sustained release formulations generally consist of a biologically active ingredient and an appropriate carrier such as biodegradable and biocompatible polymer. The polymer serves to control the release of the active ingredient from the formulation, thereby retaining its effects for a long period. The polymer is also helpful in reducing side-effects by preventing the active ingredient from being released in a large amount at a time. Examples of biologically acceptable polymers employable in sustained release formulations are proteins such as collagen and gelatin, peptides, polysaccharides, poly-amino acids, and the like. The formulation comprising an active ingredient and one or more of suitable polymers is formed into various kinds of shapes, for instance, bar- or needle-like, spherical, microgranular, membranous, spongy or ring-like shapes according to the desired administration style. For example, EP-A-139286 discloses bar- or needle-like shaped formulations prepared from a mixture comprising an active ingredient and gelatin and/or collagen as a carrier.

The formulation is typically prepared by subjecting a dried composition comprising an active ingredient and a polymer such as collagen to the compression molding. Alternatively, a pasty high viscous composition containing solvated polymer is molded by extrusion molding using an appropriate dies, and the wetted molded product is conventionally dried. In the latter case, the molding and drying processes to obtain a needle- or bar-like shaped formulation can be carried out according to any of the following processes; 1) extruding said composition onto a round-bottomed linear slot made on the surface of a plate of hydrophobic resin such as acrylic polymer, and drying the resultant bar-like product: 2) drying the molded bar-like shaped product suspended in a metallic frame; 3) drying the composition placed in a template. However, these conventional methods have several disadvantages. Among them, deformation of the shape of the molded product during the drying process was the most serious problem. In the process 1), it is hard to maintain the original shape of the molded product during the drying process, partly because the surface of the wetted molded product tends to be dried first and uniform drying cannot be attained, and partly because the portion contacting with the acrylic plate is deformed due to the weight. In the process 2), where the length of the bar-like product is more than about 10 cm, it is elongated by its own weight and results in the difference of diameters between the top and the bottom. On the other hand, if the molded product is cut shorter than about 10 cm, in fear of above phenomenon, the yield of final products may decrease due to the increase of odds and ends products. In the process 3), it is very difficult to keep the shape of the molded products as it is due to the inherent nature of collagen and the like, that is, the tendency to contract in progress of dehydration. Thus, the products obtained by the conventional methods mentioned above are not uniform in their shapes and weights and are not suitable for commercial use. Therefore, development of an effective method for drying a wetted molded product without leading to deformation of the shape of the molded product has been one of the major subjects in the art.

It has now been found that a molded product having constant and invariable shape can be obtained in high yield by subjecting a wetted molded product of pasty high viscous composition to dehydration process while wholly or partially contacting the product with an open-cell foamed hydrophobic membrane.

Thus, an object of the present invention is to provide a method for drying a wetted molded product prepared from a pasty high viscous composition which comprises one or more of polymers such as collagen and/or gelatin as carrier and, if desired, one or more of active ingredients, which is characterized by subjecting the wetted molded product to dehydration process while wholly or partially contacting the same with an open-cell foamed hydrophobic membrane.

Figure 1:
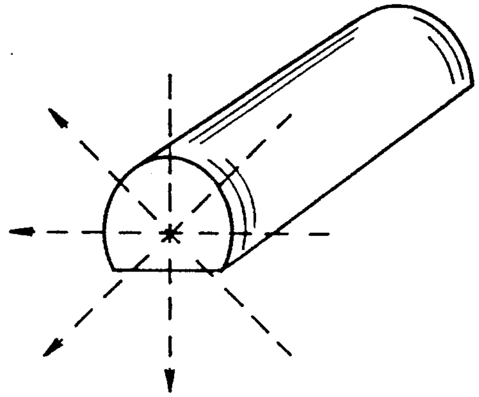
FIG. 1 is a perspective view of a bar-like shaped product prepared by a conventional method.

The "open-cell foamed hydrophobic porous membrane" which can be used in the present invention is selected from gas-permeable porous films having non-adhesive property so that the dried product can be easily removed therefrom. Examples of preferable non-adhesive porous film are those prepared from polymers such as tetrafluoroethylene resin, high density polyethylene or polypropylene resins, according to conventional procedures. The preferred film has the void ratio of more than 50% (preferably, 60–90%) and the thickness of less than 1 mm (preferably, 0.01–0.3 mm).

The film can be prepared in conventional manners. For instance, tetrafluoroethylene resin film is subjected, before sintering, to uniaxial or biaxial stretching (stretching rate: about 4–5 folds) at an appropriate temperature, for instance, a temperature between 250° C. and 300° C. so that the polymer molecules take a fiber-like orientation, and subsequently calcinated at an appropriate temperature (about 350° C. to 400° C.) for a short period, for instance, a few seconds. This process gives a porous film which has a void ratio of more than 50%, thickness of less than 1 mm, and such a structure that the fibers are connected each other via knot junctions. Alternatively, commercially available non-adhesive porous films such as GORETEX® (based on tetrafluoroethylene resin) or ESPOALL® (based on polyethylene) can be used in the present invention.

The "pasty high viscous composition" of the invention may essentially consist of biologically acceptable polymer or may contain biologically active ingredient together with said polymer. There is no criteria to the polymer employed in the present invention. However, there exist some preferable polymers, such as proteins (for example, collagen, gelatin, serum albumin, and the like), poly-saccharides (for example, dextran, amylose, cellulose, chitin, chitosan, and the like), glycoproteins, peptides, poly-amino acids (for example, poly-alanine, poly-glutamic acid, copoly(leucine-lysine), and the like) and polynucleotides (for example, DNA, RNA, and the like). According to the present invention, these polymers are employable alone or in combination of two or more therof.

The polymers employable in the present invention may be those which have been chemically synthesized or produced by genetic engineering, as well as those extracted from biological tissues or organs.

The formulation according to the present invention may contain pharmaceutically acceptable stabilizers, preservatives and anesthetic agents, as well as various additives helpful for improving easy molding of the composition or adjusting release-sustaining efficiency of the formulation.

A detailed description of an embodiment of the present invention is provided below.

A pasty high viscous composition comprising polymer(s) such as collagen and/or gelatin (concentration: 10–50 w/w %, preferably 20–40 w/w %) is molded into bar-like shaped product by extruding with the aid of a device such as syringe on a porous open-cell foamed membrane, such as tetrafluoroethylene film (GORE-TEX®), and the molded product on the film are allowed to stand under relative humidity of 50–80% (when measured at a stationary phase) at room temperature or below for 24–72 hours. During the dehydration process, elastic properties of the porous membrane serves to prevent the molded product from getting deformation due to the gravity. The porous membrane also serves to facilitate the uniform removal of the solvent from the whole surface area of product through the numerous pores. Typically, a bar-like shaped product placed on a porous membrane is situated on a slope (angle: 0°–90°) during the dehydration process. The slope helps to disperse the gravity loaded on the contacting surface of the product with the membrane and reduce the deformation effect thereof.

Alternatively, the pasty high viscous composition is charged in a template made of a porous membrane, which is then suspended during the drying process. The template of porous membrane prevents the molded product from getting elongation due to its weight.

Under circumstances of relative humidity of about 50–80%, partial and imbalanced drying at the surface of the molded product is minimized and gradual and uniform drying is established. Where collagen and/or gelation is employed as a carrier, the drying rate should be preferably less than 1 $mg/mm^2/24hr$.

According to another embodiment of the present invention, a composition containing one or more polymers such as collagen and/or gelatin is lyophilized after charged and retained in a needle-like shaped template made of a porous membrane. Alternatively, the molded product charged in the template may be successively immersed in a series of aqueous solutions containing an increasing amount of a hydrophilic organic solvent so that the water contained in the product is gradually replaced by the organic solvent. Finally, the organic solvent held by the product may be air-dried.

In the latter procedure, preferred set of mixtures contain, for example, 50%, 70%, 80%, 90%, 95% and 100% by weight of the organic solvent. The hydrophilic organic solvents employable in the mixture include, for example, alcohols such as methanol and ethanol, and ketones such as acetone, and other water-miscible solvents.

A pharmaceutical formulation is obtained where a pharmaceutically active ingredient is incorporated into the pasty high viscous composition. There is no criteria to the active ingredients employable in the pharmaceutical formulations. For example, active ingredients include synthetic chemical compounds such as tespamin, antibiotics such as adriamycin, breomycin and mitomycin, enzymes such as tissue plasminogen activator, various bio-hormones such as growth hormones, growth hormone releasing factors, somatomedins, calcitonin, prostaglandins and prostacyclines, cytokines such as interferons, interleukin, tumor necrosis factor, colony stimulating factor, macrophage activating factor and macrophage migration inhibition factor, and the like.

It will be recognized that the drying method of the present invention can be applied to the preparation of a various shapes of formulations, such as spherical, microgranular, membraneous, spongy and ring-like shaped formulations as well as bar- and needle-like shaped formulations.

Figure 2:
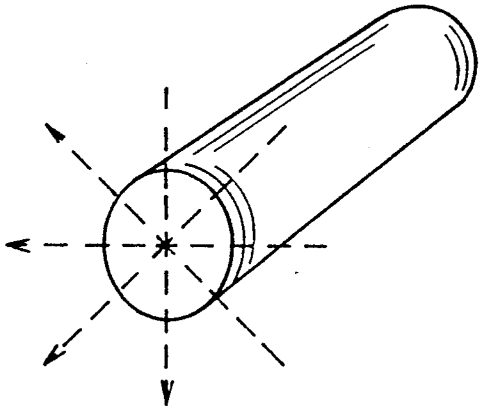
FIG. 2 is a perspective view of a bar-like shaped product prepared by the method of the present invention.

The molded product prepared by the drying method of the present invention retains the original shape just molded, as shown in FIG. 2 illustrating a bar-like shaped formulation. As far as such bar-like shaped formulation is concerned, uniformity of the formulation can be determined by means of a longer diameter/shorter diameter ratio of the cross section of the formulation. Experiment 1 hereinafter described shows that the longer diameter/shorter diameter ratio of the product of the invention is closer to 1 than the product prepared by conventional methods and that the dispersion of the data obtained for the products of the invention is less than that of the products of the prior art. Since the ideal ratio is 1, Experiment 1 clearly shows that the uniformity of the product prepared by the present invention is much better than that of the product of prior art.

Excellent uniformity of the product of the present invention provides a great advantage when it is medically used. For instance, such uniform product having a longer diameter/shorter diameter ratio of close to 1 permits the use of minimum diameter of injection needle, which helps to give the patient a reduced pain. Thus, the bar- or needle-like product of the present invention, typically ranging from 0.5 mm to 3 mm in diameter and 5 mm to 30 mm in length, is conveniently administered to patients by the use of a fiberscope forceps or indwelling needle.

The following examples are presented by way of illustration of specific embodiments of the invention.

EXAMPLE 1

Water (1.6 ml) and 1N—HCl (0.7 ml) were added to powdered atelocollagen (1 g) and mixed thoroughly to obtain a 30 w/w % aqueous atelocollagen solution (pH 3.5). The solution was charged in a plastic syringe and centrifugally deaerated at 12,000G at temperature of 20° C. for one hour. After attachment of a nozzle having an inner-diameter of 1.7 mm to the syringe, the solution was linearly extruded from the nozzle onto a porous membrane, GORETEX® (a porous tetrafluoroethylene film; thickness=160μm, void ratio=80%), which was supported by a long U-shaped aluminium plate. The plate was placed, with a slope, in a desiccater having a relative humidity of 75%, and the desicater was allowed to stand for 72 hours in a refrigerator, which gave a dried product (water content: 30%). This product was further dried over silicagel for 24 hours in a desiccater to obtain a bar-like shaped solid product, of which cross section was a disk like the initial shape before drying. The final product showed the water content of 10%.

EXAMPLE 2

A 2 w/w % aqueous atelocollagen solution (100 ml, pH 3.5) was mixed with a 100 MU/ml solution of α-interferon (9.1 ml) and the resultant mixture was lyophilized. To the lyophilized product were added water (4.5 ml) and 1N—HCl (0.2 ml), and the mixture was thoroughly admixed in a mortar. The resultant uniform mixture was treated in the same manner as in Example 1 to obtain a bar-like shaped solid product.

EXAMPLE 3

Three porous membranes ESPOALE® (polyethyrene film) having a thickness of 20, 30 and 50 μm and void ratio of 65, 70 and 75%, respectively, were supported by U-shaped aluminium plates. Centrifugally deaerated 30 w/w % aqueous atelocollagen solution prepared by the same process as described in Example 1 was linearly extruded from a nozzle having an inner-diameter of 1.7 mm onto each of these membranes. The extruded products were treated in the same way as in Example 1 to obtain bar-like shaped solid products.

EXAMPLE 4

Water (2.2 ml) and 1N—HCl (0.8 ml) were added to powdered atelocollagen (1 g) and mixed thoroughly to obtain a 25 w/w % aqueous atelocollagen solution (pH 3.0). The solution was charged into a plastic syringe and centrifugally deaerated at 10,000G at temperature of 4° C. for one hour. Thereafter, the deaerated mixture was charged into a GORETEX® tube (porous tetrafluoroethyrene film; inner-diameter 2.0 mm, thickness 0.4 mm, void ratio 70%, length 10 cm), which was then lyophilized to obtain a bar-like shaped sponge.

EXAMPLE 5

The centrifugally deaerated 25 w/w % atelocollagen solution prepared by the same way as described in Example 4 was charged into a GORETEX® tube (porous tetrafluoroethyrene film; inner-diameter 2.0 mm, thickness 0.4 mm, void ratio 70%, length 10 cm) and frozen at −20° C. The tube containing the frozen product was immersed in 50% ethanol at −20° C. and allowed to stand for 24 hours. The tube was then immersed in 70, 80, 90, 95 and 100% aqueous ethanol solutions successively, and finally air-dried to obtain a bar-like shaped sponge.

EXAMPLE 6

A 2 w/w % aqueous atelocollagen solution (100 ml, pH 3.5) and a 5 ml of aqueous solution of growth hormone releasing factor (GRF: 20 mg/ml) were admixed thoroughly and the mixture was lyophilized. To the lyophilized product were added water (4.5 ml) and 1N-HCl (0.2 ml), and the mixture was thoroughly admixed in a mortar to obtain a uniform mixture. The mixture was treated in the same manner as in Example 1 to obtain a bar-like shaped solid product.

EXPERIMENT 1

A bar-like shaped product extruded onto a round-bottomed linear slot of acrylic sheet was dried in the same manner as in the present invention, and the dried product was compared with that obtained by the method of the present invention with respect to the shape.

PROCESS (i) A 30 w/w % aqueous atelocollagen solution prepared by the same manner as described in Example 1 was extruded from a nozzle (inner-diameter: 1.7 mm) onto a slot (R10) made on the plate of acrylic polymer and dried in accordance with the drying method described in Example 1 to yield a bar-like shaped solid product, which is shown in FIG. 1 of the accompanying drawing. The arrows in the figure show how the diameters were measured.

(ii) A 30 w/w % aqueous atelocollagen solution prepared by the same manner as described in Example 1 was linearly extruded from a nozzle (inner-diameter: 1.7 mm) onto a GORETEX® membrane and dried in accordance with the drying method described in Example 1 to yield a bar-like solid product, which is shown in FIG. 2 of the accompanying drawing.

COMPARISON

Product prepared by process (i) The portion of the product which contacted with the acrylic plate was distorted due to its own weight and appeared flat. In addition, uniform drying was not attained due to delayed drying at the distorted portion.

Product prepared by process (ii) Any distortion was not observed in the dried bar-like produce and it retained the original shape.

The bar-like shaped products obtained above were cut with a knife so that the final bar-like shaped formulations having a diameter of about 1 mm and a length of about 10 mm may be obtained. The longer diameter (LD) and shorter diameter (SD) were measured for 10 formulations each prepared by the above methods (i) and (ii), and LD/SD ratios were calculated respectively. The measurement of the diameters was conducted by the use of a dial gauge and repeated 4 times with 45° shifting each time as shown in FIGS. 1 and 2. The maximum and minimum data were designated as LD and SD respectively. The following table shows the test results.

| | Method (i) | Method (ii) |
|---|---|---|
| LD/SD | 1.555 ± 0.179 | 1.033 ± 0.013* |

Asterisk (*) shows that the value is statistically significant with the level of significance of 1%.

The table shows that the LD/SD ratio of the formulations prepared by the method of the present invention (ii) is closer to 1, and has less dispersion as compared with those prepared by the conventional method (i).

EXPERIMENT 2

The dried bar-like shaped product obtained in accordance with a conventional method, where the molded product is suspended in a metal frame and dried, was compared with a dried product obtained in accordance with the method described in Example 2.

PROCESS (i) The 30 w/w % aqueous atelocollagen solution described in Example 1 was extruded from a nozzle having an inner-diameter of 1.7 mm into a bar-like product, which was then suspended in an aluminium frame and dried in accordance with the method described in Example 1 to obtain a bar-like shaped product.

(ii) The 30 w/w % aqueous atelocollagen solution described in Example 1 was linearly extruded from a nozzle having an inner-diameter of 1.7 mm onto the GORETEX® film and dried in accordance with the method described in Example 1 to obtain a bar-like shaped product.

COMPARISON

A deviation of the difference in diameter from the average diameter of the products is shown below. The diameter was measured every 1 cm for each solid, and the difference between the maximum diameter and the minimum diameter was divided by the average diameter to obtain the deviation, which is shown by persentage.

| (i) | | (ii) | |
|---|---|---|---|
| Rod Length | Deviation | Rod Length | Deviation |
| 10 cm | 4.2% | 30 cm | 5.5% |
| 20 cm | 22.1% | 60 cm | 5.4% |
| 30 cm | 23.6% | 100 cm | 5.7% |

Although the deviation increased with the increase of rod length in process (i}, it was constant in process (ii) regardless of rod length. Although the deviation of product (i) is relatively small where the rod length is 10 cm, such a short product is not suitable for industrial production of the products in view of the fact that there is a considerable loss at the top portion attached to the metal frame.

On the other hand, the bar-like products prepared by process (ii) could be long enough to be industrially employed. Thus, the method of the invention is industrially effective for producing, with high yield, uniform formulations molded into various shapes.

What is claimed is:

1. A method for drying a wetted molded product of pasty high viscous composition, comprising subjecting a wetted molded product of pasty high viscous composition consisting essentially of one or more fiscompatible polymers, or said polymer(s) together with one or more biologically active ingredients, to a dehydration process while wholly or partially contacting said product with an open-cell foamed hydrophobic porous membrane, thereby producing in high yield a product which retains its original, undistorted molded shape.

2. The method of claim 1, wherein said dehydration process is conducted by gradual air-drying under relative humidity of 50-80% while positioning said molded product on said porous membrane or keeping said product in a template made of said porous membrane.

3. The method of claim 1, wherein said dehydration process is conducted by repeatedly immersing said molded product held in a template made of said porous membrane in a mixture of water and a hydrophilic organic solvent on condition that a mixture containing an increasing amount of said hydrophilic organic solvent is employed each time, thereby replacing the water contained in said molded product with said organic solvent, and finally, removing said organic solvent held by said product by air-drying.

4. The method of claim 1, wherein said dehydration process is conducted by lyophilizing said molded product held in a template made of said porous membrane.

5. The method of claim 1 wherein said porous membrane is highly solvent-resistant and devoid of adhesiveness.

6. The method of claim 1, wherein said biocompatible polymer is a member selected from the group consisting of natural or synthetic proteins, polysaccharides, glycoproteins, peptides, poly-amino acids, and polynucleotides.

7. The method of claim 1, wherein said biocompatible polymer is collagen and/or gelatin, or collagen and one or more other polymers.

8. The method of claim 1, wherein said biocompatible polymer is atelocollagen.

9. The method of claim 1, wherein said hydrophobic porous membrane is made of a polymer selected from the group consisting of tetrafluoroethylene, polypropylene, and polyethylene.

10. The method of claim 1, wherein said hydrophobic porous membrane is a porous tetrafluoroethylene film.

11. The method of claim 6, wherein said hydrophobic porous membrane is made of a polymer selected from the group consisting of tetrafluoroethylene, polypropylene, and polyethylene.

12. The method of claim 6, wherein said hydrophobic porous membrane is a porous tetrafluoroethylene film.

13. The method of claim 7, wherein said hydrophobic porous membrane is made of a polymer selected from the group consisting of tetrafluoroethylene, polypropylene, and polyethylene.

14. The method of claim 7, wherein said hydrophobic porous membrane is a porous tetrafluoroethylene film.

15. The method of claim 8, wherein said hydrophobic porous membrane is made of a polymer selected from the group consisting of tetrafluoroethylene, polypropylene, and polyethylene.

16. The method of claim 8, wherein said hydrophobic porous membrane is a porous tetrafluoroethylene film.

17. A method for drying a wetted molded product of pasty high viscous composition, comprising subjecting a wetted molded product of pasty high viscous composition consisting essentially of one or more biocompatible polymers selected from the group consisting of natural or synthetic proteins, polysaccharides, glycoproteins, peptides, polyamido acids, polynucleotides said polymer(s) together with one or more biologically active ingredients, to a dehydration process while wholly or partially contacting said product with an open-cell foamed hydrophobic porous membrane which has non-adhesive properties, thereby producing in high yield a product which retains it original, undistorted molded shape.

18. The method of claim 17, wherein said hydrophobic porous membrane is made of a polymer selected from the group consisting of tetrafluoroethylene, polypropylene, and polyethylene.

19. The method of claim 17, wherein said hydrophobic porous membrane is a porous tetrafluoroethylene film.

* * * * *